(No Model.)

C. A. SMYTH.
SECONDARY BATTERY.

No. 292,142. Patented Jan. 15, 1884.

Attest,
W. H. H. Knight
H. Bernhard

Inventor,
Charles A. Smyth
per Edson Bros.
Attorneys

UNITED STATES PATENT OFFICE.

CHARLES A. SMYTH, OF HOOPESTON, ILLINOIS, ASSIGNOR OF ONE-HALF TO HAMER T. BROWN, OF SAME PLACE.

SECONDARY BATTERY.

SPECIFICATION forming part of Letters Patent No. 292,142, dated January 15, 1884.

Application filed March 7, 1883. (No model.)

*To all whom it may concern:*

Be it known that I, CHARLES A. SMYTH, a citizen of the United States, residing at Hoopeston, in the county of Vermillion and State of Illinois, have invented certain new and useful Improvements in Secondary Batteries; and I do declare that the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to secondary or storage batteries for electrical machines or devices; and the novelty consists in the construction, arrangement, treatment, and adaptation of parts, as will be more fully hereinafter set forth, and specifically pointed out in the claims.

The object of the invention is to provide a secondary or storage battery which shall present a maximum surface of oxidized lead to the action of dilute sulphuric acid, as accumulators for the electricity; and the invention consists, essentially, in the devices illustrated in the accompanying drawings, which form a part of this specification, and in which—

Figure 1:
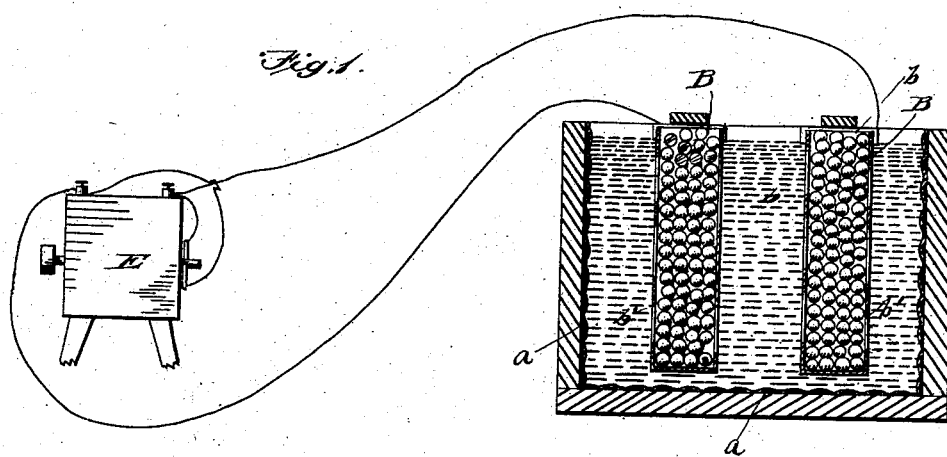
Figure 2:
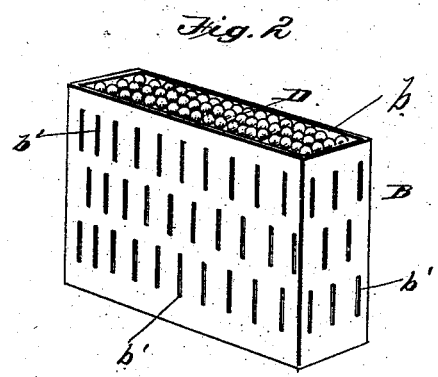

Figure 1 is a vertical section of the battery in position; Fig. 2, a detail perspective view of one of the removable accumulators, and Fig. 3 an enlarged detail of one of the lead shot.

The object which is sought to be attained by this invention—that is to say, the multiplication of lead surface in secondary batteries—has been attempted in various and numerous ways—such as the employment of lead plates and balls in the sulphuric-acid bath.

Referring to the drawings, in which similar letters of reference indicate like parts in all the figures, A represents the box or vessel which is adapted to hold the sulphuric acid which forms the battery, and it is provided with a lining of corrugated sheet-lead, $a$, which serves to protect the vessel A from the corrosive action of the acidulated water.

B represents a rectangular box of corrugated sheet-lead, having open top $b$, as shown. These boxes B are of length slightly less than the space within the walls of the vessel A, in which they are to be suspended, in order that the dilute sulphuric acid of the battery may act upon every side, and the sides, ends, and bottom of each of these boxes B are provided with alternating slits $b'$, to allow the free circulation of the acid throughout. These boxes B, which, for convenience, I will designate as "accumulators," are narrow compared with their length and depth, so that two or more may be suspended in each battery, vessel, or cell.

Figure 3:
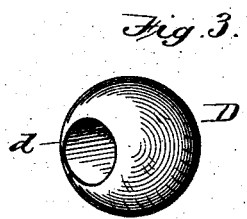

In Fig. 3 I illustrate, upon an enlarged scale, one of my shots D. Each shot of lead is provided with a hole, $d$, extending through it at or near its center, and it may also be provided with a similar hole at right angles thereto. These perforations greatly increase the accumulating-surface of the shot, and add greatly to the efficiency of the device. The shot are arranged in the perforated boxes B, so that the sulphuric acid may freely circulate through and between them, so as to receive the action of the extended lead surface thus provided.

Before arranging the battery for service the accumulators, consisting of the boxes B and shot, are subjected to a bath of nitric acid and water to oxidize the surfaces; and, of course, the longer such surfaces are exposed to the action of said bath the deeper the oxidation.

The spaces within and around the balls may be filled with white lead, mixed with sulphuric acid and water, whereby I secure almost a solid block of spongy lead, which is adapted to store electrical energy, whereby the storage capacity of the battery is increased.

When it is desired to arrange the battery for service, the previously oxidized electrodes B and D, treated as described, are suspended by any proper means in the sulphuric acid of the battery-vessel A, and the wires of the dynamo E applied.

I do not desire, in this application, to broadly cover the system of increasing the lead surface in secondary batteries, and such claim is not made; but What I do claim is—

1. In a secondary or storage battery, the combination of the vessel A, having the corrugated sheet-lead lining a, the boxes B, having slits b', and shot D, having perforations d previously oxidized in a bath of nitric acid, the whole arranged as and for the purposes set forth.

2. In a secondary or storage battery, the combination of the vessel A, having the corrugated sheet-lead lining a, the boxes B, having slits b', and shot D having perforations d previously oxidized in a bath of nitric acid, the balls being filled with white lead mixed with sulphuric acid and water, the whole arranged as and for the purposes set forth.

In testimony whereof I affix my signature in presence of two witnesses.

CHARLES A. SMYTH.

Witnesses:
H. M. STEELY,
DAVID BEDELL.